(12) United States Patent
Hawk et al.

(10) Patent No.: US 10,346,132 B2
(45) Date of Patent: Jul. 9, 2019

(54) ACCELERATION-BASED WINDOW GLASS BREAK DETECTION

(71) Applicant: MOJ.IO INC., Vancouver (CA)

(72) Inventors: Kenneth W. Hawk, Palo Alto, CA (US); Soheil Azimi, Vancouver (CA); Taran Grey, Vancouver (CA); Behraad Bahreyni, Vancouver (CA)

(73) Assignee: MOJ.IO INC., Vancouver, BC (CA)

( * ) Notice: Subject to any disclaimer, the term of this patent is extended or adjusted under 35 U.S.C. 154(b) by 104 days.

(21) Appl. No.: 15/727,196

(22) Filed: Oct. 6, 2017

(65) Prior Publication Data

US 2019/0107998 A1    Apr. 11, 2019

(51) Int. Cl.
| | | |
|---|---|---|
| *B60R 25/34* | (2013.01) | |
| *G06F 7/02* | (2006.01) | |
| *B60R 25/10* | (2013.01) | |
| *G07C 5/08* | (2006.01) | |

(52) U.S. Cl.
CPC .......... *G06F 7/026* (2013.01); *B60R 25/1004* (2013.01); *B60R 25/1009* (2013.01); *B60R 25/34* (2013.01); *G07C 5/0808* (2013.01)

(58) Field of Classification Search
CPC .............................. G06F 7/026; G07C 5/0808
See application file for complete search history.

(56) References Cited

U.S. PATENT DOCUMENTS

| | | |
|---|---|---|
| 5,510,765 A | 4/1996 | Madau |
| 5,742,232 A | 4/1998 | Kurahashi et al. |
| 6,493,687 B1 * | 12/2002 | Wu .................. G08B 13/04 340/541 |

FOREIGN PATENT DOCUMENTS

| | | |
|---|---|---|
| EP | 1688328 A1 | 8/2006 |
| WO | 2016138170 A1 | 9/2016 |

* cited by examiner

*Primary Examiner* — Genna M Mott
(74) *Attorney, Agent, or Firm* — Alleman Hall Creasman & Tuttle LLP

(57) ABSTRACT

A telematics device located on-board a vehicle or other enclosure assists in detecting a glass break event for a window of the vehicle or enclosure based on acceleration measurements obtained from acceleration sensors of the telematics device. A power spectral density (PSD) for a plurality of packets of acceleration data within a higher frequency band and/or a lower frequency band are determined. A glass break event is detected upon determining that an average PSD for the higher frequency band exceeds an upper PSD threshold. Alternatively or additionally, a glass break event is detected upon determining that a second maximum PSD is greater than a first PSD threshold for the lower frequency band, and that a difference between the second maximum PSD and a minimum PSD is greater than a second PSD threshold for the lower frequency band.

20 Claims, 9 Drawing Sheets

| Event Code | Frequency Range | PSD values in dB for 10x 50ms-packets | | | | | | | | | | 500 ms Avg. | Results in dB |
|---|---|---|---|---|---|---|---|---|---|---|---|---|---|
| A | P1 20-200Hz | 105.6 | 100.6 | 94.6 | 84.4 | 74.9 | 73.8 | 61.1 | 62.6 | 58.6 | 55.5 | 77.2 | $P2_{av}$=57.1 >$P_{TH2}$ $P1_{max2}$=62.6 <$P_{TH3}$ |
|   | P2 200-1000Hz | 88.9 | 83.4 | 71.5 | 57.2 | 52.1 | 46.7 | 41.5 | 43.2 | 43.9 | 42.8 | 57.1 | $P1_{min}$=55.5 $\Delta P1$=7.1 >$P_{TH4}$ |
| D | P1 20-200Hz | 101 | 85.1 | 75.1 | 74.7 | 79.1 | 79.7 | 82.3 | 82.7 | 44.7 | 42 | 74.6 | $P2_{av}$=67.6 >$P_{TH2}$ $P1_{max2}$=82.7 |
|   | P2 200-1000Hz | 88.5 | 66.9 | 67.0 | 64.6 | 76.8 | 72.7 | 77.3 | 78.1 | 41.9 | 42.1 | 67.6 | $P1_{min}$=42 $\Delta P1$=40.7 |
| E | P1 20-200Hz | 100.4 | 86.2 | 79.4 | 73.8 | 72.5 | 62.1 | 71.4 | 73.5 | 67.1 | 67.3 | 75.4 | $P2_{av}$=52.3 >$P_{TH2}$ $P1_{max2}$=73.5 >$P_{TH3}$ |
|   | P2 200-1000Hz | 65.8 | 58.3 | 52.3 | 50.7 | 47.6 | 48.2 | 50.8 | 52.4 | 47.4 | 49.8 | 52.3 | $P1_{min}$=62.1 $\Delta P1$=11.4 >$P_{TH4}$ |

FIG. 5

EVENT CODES
A - DRIVER-SIDE DOOR CLOSING
B - PUNCHING DRIVER-SIDE WINDOW
C - BANGING DRIVER-SIDE WINDOW WITH STONE
D - BREAKING PASSENGER-SIDE WINDOW
E - BREAKING DRIVER-SIDE WINDOW $$P1 = \sum_{k=2}^{n1} P^k/(n1-1); \quad P2 = \sum_{k=n1+1}^{n2} P^k/(n2-n1);$$

FIG. 11

ACCELERATION-BASED WINDOW GLASS BREAK DETECTION

BACKGROUND

Many modern vehicles include on-board electronic systems that manage and record operation of the vehicle's various subsystems. On-board electronic systems may include or otherwise support on-board diagnostic (OBD) services that enable vehicle owners and repair technicians to access diagnostic information or other forms of operational information from the electronic system. As one example, on-board electronic systems may be accessed via a data interface in the form of a physical wired data link connector or data port, such as ALDL, OBD-I, OBD-1.5, OBD-II, or other suitable data interface.

SUMMARY

A telematics device located on-board a vehicle or other enclosure assists in detecting a glass break event for a window of the vehicle or enclosure based on acceleration measurements obtained from acceleration sensors of the telematics device. A power spectral density (PSD) for a plurality of packets of acceleration data within a higher frequency band and/or a lower frequency band are determined. A glass break event is detected upon determining that an average PSD for the higher frequency band exceeds an upper PSD threshold. Alternatively or additionally, a glass break event is detected upon determining that a second maximum PSD is greater than a first PSD threshold for the lower frequency band, and that a difference between the second maximum PSD and a minimum PSD is greater than a second PSD threshold for the lower frequency band.

This summary includes only some of the concepts disclosed in greater detail by the following detailed description and associated drawings. As such, claimed subject matter is not limited to the contents of this summary.

BRIEF DESCRIPTION OF THE DRAWINGS

FIG. 5 is a table that includes example power spectral density values obtained from a vehicle in which the above threshold values can be used to distinguish a passenger-side glass break event from a door close event.

FIG. 11 depicts an equation described in further detail within the context of the glass break detection techniques disclosed herein.

DETAILED DESCRIPTION

Figure 1:
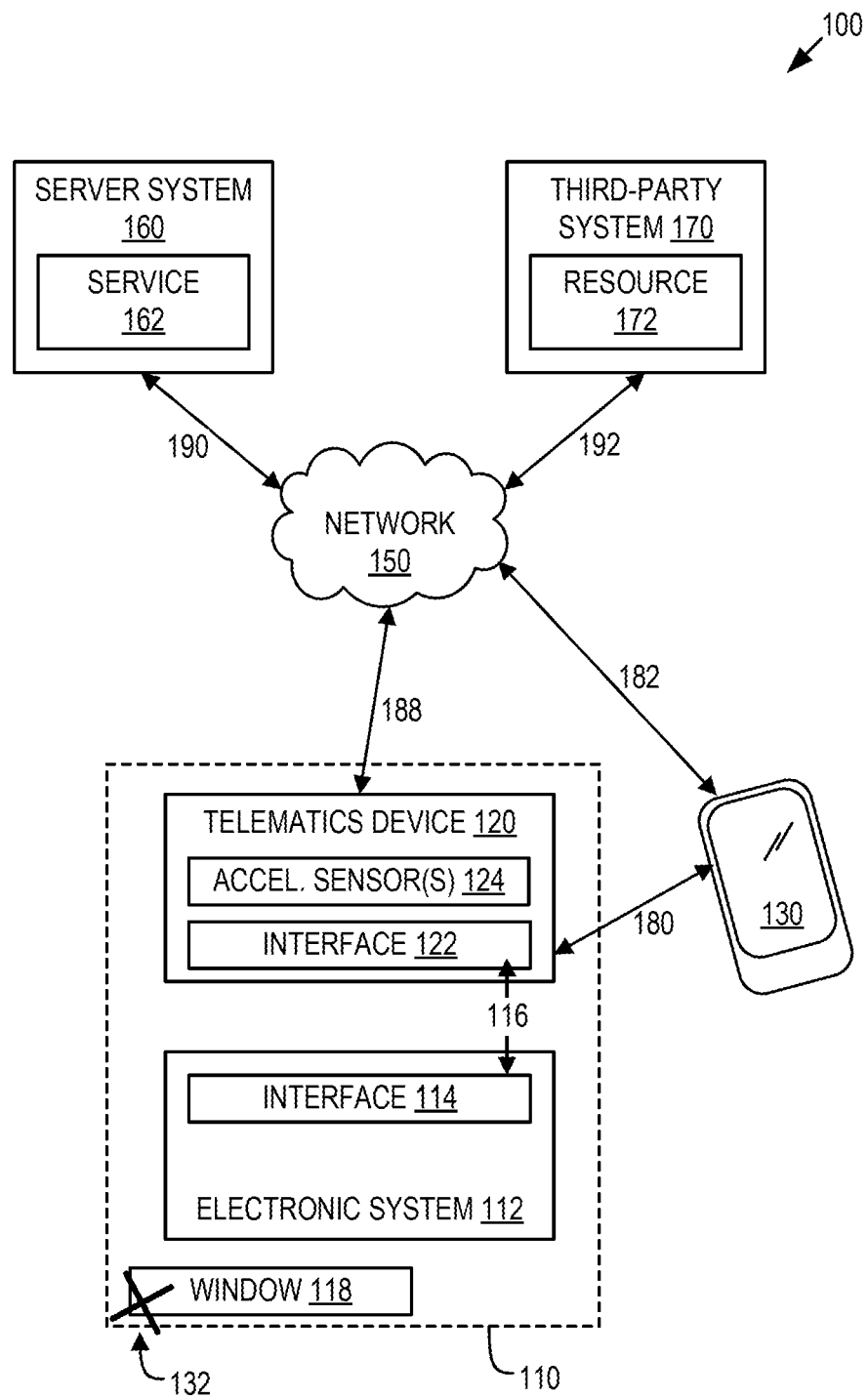
FIG. 1 is a schematic diagram depicting an example environment within which the disclosed acceleration-based window glass break detection techniques may be implemented.

FIG. 1 is a schematic diagram depicting an example environment 100 within which the disclosed acceleration-based window glass break detection techniques may be implemented. Within environment 100, an enclosure 110 includes one or more windows, such as window 118 represented schematically in FIG. 1. An enclosure may include a cabin or other substantially enclosed region of a vehicle, trailer, mobile or stationary building structure, etc. A vehicle may refer to a road vehicle, a passenger vehicle, a work vehicle, a rail-based vehicle, an aircraft, a watercraft, etc. An enclosure typically refers to a fully or substantially enclosed structure, but an enclosure may additionally refer to partially enclosed structures such as a convertible vehicle, an open roof building structure, as well as fully enclosed structures that have open windows or doors, to name a few examples. Windows, such as window 118, may be formed from glass or other suitable material. For example, windows for vehicles and dwellings are typically formed from glass that has been manufactured to shatter into a large number of discrete pieces upon impact.

A telematics device 120 is schematically depicted in FIG. 1 located within enclosure 110 or mounted to a structure that forms enclosure 110. Telematics device 120 includes a set of one or more acceleration sensors 124. An acceleration sensor may refer to an accelerometer, gyroscope, inertial sensor, etc. that is capable of measuring acceleration, such as acceleration of telematics device 120 and the structure that forms enclosure 110, for example. Two or more acceleration sensors may be referred to as a multi-sensor array, and may be configured to measure acceleration in multiple axes or reference frames. Telematics device 120 may take the form of a computing device or computing system that obtains acceleration measurements from the one or more acceleration sensors 124, and processes the acceleration measurements in accordance with the techniques disclosed herein.

Telematics device 120 may include an electronic interface 122 by which the telematics device communicates and/or exchanges electrical power/ground reference with an electronic system 112 of enclosure 110 via a corresponding interface 114 over a link indicated schematically at 116. Such communications and/or power/ground transfer may be bi-directional, from telematics device 120 to electronic system 112, and/or from electronic system 112 to telematics device 120. Within the context of enclosure 110 taking the form of a vehicle, electronic system 112 may take the form of an on-board vehicle control system that manages and records operation of the vehicle's various subsystems. This on-board vehicle control system may include an on-board diagnostics subsystem via which telematics device 120 interacts with the vehicle control system. Interfaces 114, 122 may take the form of an on-board diagnostics (OBD) compliant hardware-based data port, and link 116 may be implemented in accordance with an OBD protocol such as ALDL, OBD-I, OBD-1.5, OBD-II, as non-limiting examples. Communications may include OBD data transmitted by electronic system 112 to telematics device 120, which in turn may be processed and/or transmitted to a remote computing device over a wireless communications link. As another example, telematics device 120 may draw electrical power and/or exchange ground reference with electronic system 112 to power components of telematics device 120. Additionally or alternatively, telematics device 120 may include its own power source, such as a battery. Examples of communications from telematics device 120 to electronic system 112 may include signals that initiate, activate, and/or deactivate one or more electronic functions at electronic system 112. For example, telematics device 120 may initiate an alarm (e.g., a vehicle burglar alarm), and deactivate vehicle starting or vehicle operation at electronic system 112.

In at least some implementations, telematics device 120 may take the form of an aftermarket device that is installed by a vehicle owner, operator, or technician after purchase of the vehicle or at the time of purchase of the vehicle. In still other implementations, telematics device 120 may form part of and/or be integrated with electronic system 112. Telematics device 120 and electronic system 112 may collectively form an on-board computing system of enclosure 110. In still other implementations, link 116 may take the form of a wireless communications link between interfaces 114, 122. Here, interfaces 114, 122 may include wireless transceivers, receivers, or transmitters, and associated electronic components supporting one or more wireless communications protocols.

In at least some implementations, telematics device 120 may be capable of communicating wirelessly with remote computing devices located off-board or external enclosure 110. For example, FIG. 1 depicts example wireless communications between telematics device 120 and remote computing devices, including mobile computing device 130 indicated by communication link 180, and various other computing devices connected to communications network 150 as indicated by communication flow 188. A mobile computing device may include or take the form of a wireless enabled portable electronic device (referred to as wireless device) such as a smartphone, a tablet computer, a notebook or laptop computer, a wearable computing device in the form of glasses or a wristwatch, etc. A service-enabled mobile computing device may take the form of a general-purpose mobile computing device on which an application program or operating system operates that is paired with or configured for use with telematics device 120 and/or a network service 162.

Wireless communications may take the form of relatively short-range wireless communications over a personal area network using the Bluetooth wireless communication protocol or other suitable wireless communication protocol. For example, communication link 180 may take the form of relatively short-range wireless communications over a personal area network using the Bluetooth wireless communication protocol or other suitable personal area network protocol. However, it will be understood that wireless communications between telematics device 120 and mobile computing devices may be provided over a local area network and/or a wide area network using other suitable protocols, and may traverse one or more intermediate networking devices and/or access points via links 182 and 188, including network 150.

Wireless communications may alternatively or additionally take the form of relatively long-range wireless communications over a wide area network and/or a local area network using cellular or other suitable communication protocols, such as 3G UMTS protocols as defined by the 3GPP standards body, 4G LTE protocols as defined by the 3GPP standards body, Wi-Fi 802.11 protocols as defined by IEEE, Wi-Max 802.16 protocols as defined by IEEE, or other suitable wireless communication protocols. For example, communication flows 182, 188, 190, 192 depicted in FIG. 1 in association with communications network 150 may take the form of relatively long-range wireless communications using one or more wireless communication protocols. Communication network 150 may include or take the form of one or more wired and/or wireless communication networks. Network 150 may include one or more wide area networks such as the Internet, cellular backhaul networks, telephone networks, intermediate network devices, and edge devices such as wireless and/or wired access points, etc.

Environment 100 of FIG. 1 further includes a server system 160 that hosts network service 162. Server system 160 may include one or more server devices that are co-located and/or geographically distributed. Service 162 may take the form of a web service that is accessible over at least an Internet protocol portion of communications network 150. Service 162 may support a programming interface, such as an API through which other computing devices and/or software modules of environment 100 may access information, provide information, and/or communicate with service 162. FIG. 1 depicts an example communication link 190 between server system 160 and communications network 150. Environment 100 of FIG. 1 may include additional computing devices or electronic systems, such as example third-party system 170 that hosts a network resource 172. As a non-limiting example, network resource 172 may refer to an emergency service, such as operated by the police, fire department, 9-11 call center, etc. FIG. 1 depicts an example communication link 192 between third-party system 170 and communications network 150.

FIG. 1 further depicts a scenario in which an impact event 132 corresponding to a physical impact upon window 118 or upon enclosure 110 occurs. In at least some scenarios, impact event 132 may result in window 118 breaking—referred to herein as a glass break event. In accordance with the glass break detection techniques disclosed herein, acceleration sensors 124 of telematics device 120 may be used to detect occurrence of an impact event and a subsequent glass break event. Upon detecting a glass break event, the telematics device or a remote computing device (e.g., server system 160) may issue an event notification directed to emergency services (e.g., third-party system 170) or to a designated point of contact associated with telematics device 120 or with enclosure 110 (e.g., mobile computing device 130).

Figure 2:
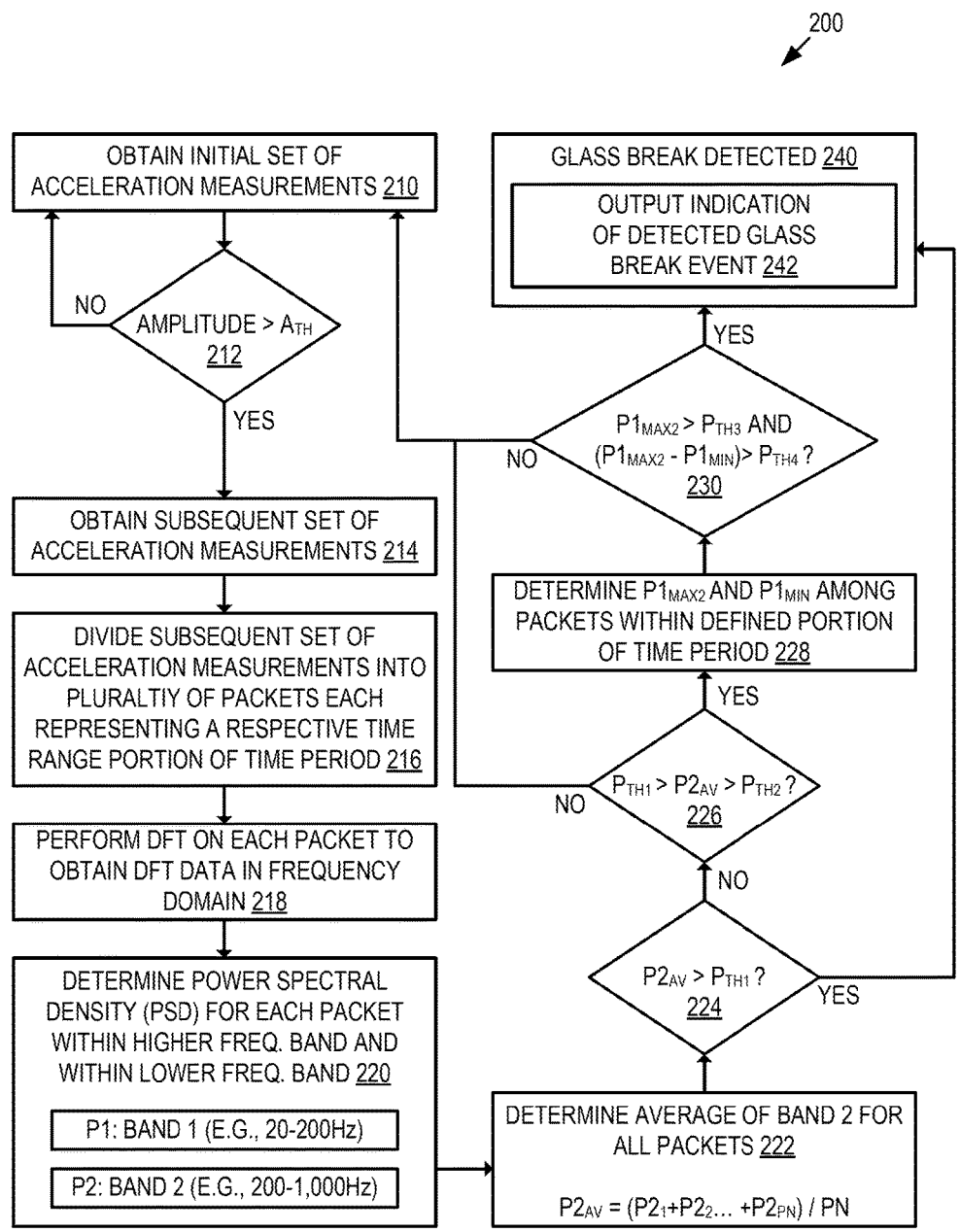
FIG. 2 is a flow diagram depicting an example method 200 for detecting a glass break event for a window.

FIG. 2 is a flow diagram depicting an example method 200 for detecting a glass break event for a window. In an example, the window may be a window of an enclosure, such as a vehicle, a trailer, a stationary building, etc. Method 200 may be performed by a computing system, such as previously described telematics device 120 alone or in combination with a remote computing device such as server system 160 of FIG. 1, as non-limiting examples.

At 210, the method includes obtaining an initial set of acceleration measurements from a set of one or more accelerometer sensors. This initial set of acceleration measurements may correspond to acceleration measurements obtained during an initial monitoring mode in which impact events corresponding to an impact to the window and/or an enclosure thereof are detected. The set of one or more accelerometer sensors may refer to previously described accelerometer sensors 124 of FIG. 1. For example, the set of one or more accelerometer sensors may form part of a telematics device that is removably connected to an on-board diagnostics (OBD) port of a vehicle or other electronic device. Each acceleration sensor may measure acceleration in a respective axis or reference frame that differs from an axis or reference frame measured by one or more other acceleration sensors to provide a multi-axis/multi-reference frame sensor array. The initial set of acceleration measurements may include, for each acceleration sensor, acceleration measurements captured in a time-based sequence at a sampling rate. Accordingly, a sensor array may concurrently capture multiple time-based sequences of acceleration measurements from multiple acceleration sensors.

At 212, the method includes determining whether one or more acceleration measurements of the initial set exceeds an initial threshold amplitude (A_TH). This initial threshold amplitude (A_TH) may be pre-defined, and may correspond to a threshold at which the initial monitoring mode transitions to a subsequent glass break detection mode following detection of an acceleration measurement (e.g., an impact to the window or enclosure) that exceeds the threshold. In the case of a multi-axis sensor array, an acceleration vector may be determined for a combination of two or more acceleration measurements concurrently obtained for different axes from two or more accelerometers of the array. A magnitude of this acceleration vector may correspond to the amplitude to which the threshold amplitude (A_TH) is compared. Alternatively or additionally, a respective threshold amplitude may be applied to each acceleration sensor on an individual sensor basis to determine whether an acceleration measurement in an individual axis exceeds a threshold amplitude for that axis. If the one or more acceleration measurements of the initial set do not exceed the initial threshold amplitude (A_TH), the process flow may return to operation 210 where additional acceleration measurements are obtained. If the one or more acceleration measurements of the initial set exceed the initial threshold amplitude (A_TH), the process flow may proceed to operation 214.

At 214, the method includes, obtaining a subsequent set of acceleration measurements from the set of one or more accelerometer sensors. This subsequent set of acceleration measurements may correspond to acceleration measurements obtained during a subsequent glass break detection mode in which a glass break event corresponding to window glass breaking as a result of the previously detected impact to the window or enclosure is detected. The subsequent set of acceleration measurements includes acceleration measurements captured in a time-based sequence over a time period at a sampling rate.

As a non-limiting example, the time period for which the subsequent set of acceleration measurements is captured may be within or include 500 milliseconds after the initial threshold amplitude is exceeded by the one or more acceleration measurements of the initial set of acceleration measurements. However, other suitable time periods may be used, including less than or greater than 500 milliseconds. The sampling rate of the subsequent set of acceleration measurements may be the same as or may differ from the sampling rate of the initial set of acceleration measurements. As a non-limiting example, the sampling rate of the subsequent set of acceleration measurements may be 2,000 samples per second or greater. In at least some implementations, the sampling rate of the initial set of acceleration measurements corresponding to the initial monitoring mode may be less than the sampling rate of the subsequent set of acceleration measurements corresponding to the subsequent glass break detection mode. The use of a lower sampling rate during the initial monitoring mode may reduce energy consumption (e.g., battery drain) while monitoring for impact events.

Operation 214, which may correspond to a transition to the subsequent glass break detection mode from the initial monitoring mode, may be performed upon determining that the initial threshold amplitude is exceeded by one or more acceleration measurements of the initial set of acceleration measurements as previously described with reference to operations 210 and 212. However, in at least some implementations, operations 210 and 212 may be omitted.

At 216, the method includes dividing the subsequent set of acceleration measurements obtained at 214 into a plurality of packets in which each packet includes a subset of the acceleration measurements of the subsequent set that were captured in a respective time range portion of the time period. As a non-limiting example, the time period may correspond to 500 milliseconds, and each packet may correspond to a respective 50 milliseconds of acceleration measurements for a total of 10 packets. As another non-limiting example, the time period may correspond to 1,000 milliseconds, and each packet may correspond to a respective 50 milliseconds or 100 milliseconds of acceleration measurements for a total of 20 packets or 10 packets, respectively. It will be understood that greater or lesser quantities of packets having greater or lesser duration may be used, and may be implementation-dependent or otherwise depend on the type of enclosure or window configuration being monitored.

At 218, the method includes performing, for each packet, a discrete Fourier transform (DFT) of the time-based sequence of the acceleration measurements of that packet to obtain DFT data in a frequency domain for that packet. The DFT applied to the acceleration measurements of each packet may include a fast Fourier transform (FFT), as an example.

At 220, the method includes determining a power spectral density (PSD) for each packet within a first frequency band based on the DFT data. Additionally or alternatively depending on implementation, at 220, the method may include determining a PSD for each packet within a second frequency band based on the DFT data. The first and second frequency bands differ from each other. For example, the first frequency band (Band 1) may correspond to a lower frequency band, and the second frequency band (Band 2) may correspond to a higher frequency band. The first and second frequency bands may partially overlap with each, may be contiguous with each other across a frequency range, or may be separated from each other by an intermediate frequency range. As a non-limiting example, the lower frequency band and the higher frequency band may be delineated from each other by at least one frequency that is within a range of 150-250 Hz (e.g., 200 Hz). For example, the lower frequency band may correspond to 0-200 Hz or 20-200 Hz, and the higher frequency band may correspond to 200-1,000 Hz or 200-1,500 Hz. As another example, the lower frequency band may include at least some frequencies within a range of 0-200 Hz or 20-200 Hz while other frequencies of this band are located outside this range, and the upper frequency band may include at least some frequencies within a range of 200-1,000 Hz or 200-1,500 Hz while other frequencies of this band are located outside of this range. As yet another example, the lower frequency band may be limited to a subset of frequencies within a range of 0-200 Hz or 20-200 Hz, and the upper frequency band may be limited to a subset of frequencies within a range of 200-1,000 Hz of 200-1,500 Hz. However, it will be understood that other suitable frequency ranges may be used, and may be implementation-dependent or otherwise depend on the type of enclosure or window configuration being monitored.

Within FIG. 2, the PSD for packets of the first frequency band (e.g., the lower frequency band) are referred to by reference to P1, and the PSD for packets of the second frequency band (e.g., the higher frequency band) are referred to by reference to P2. At 222, the method includes determining an average PSD (P2_AV) for the higher frequency band across the plurality of packets of the time range based on the PSD determined for each packet within the higher frequency band (Band 2). It will be again understood that the time range may be divided into any suitable quantity of packets.

At 224, the method includes determining whether the average PSD (P2_AV) for the higher frequency band (Band 2) exceeds an upper PSD threshold (P_TH1) for the higher frequency band. If the average PSD (P2_AV) exceeds the upper PSD threshold (P_TH1), the process flow may proceed to operation 240 where a glass break event is detected. At 242, the method includes, upon determining that the average PSD (P2_AV) for the higher frequency band (Band 2) exceeds the upper PSD threshold, outputting an indication of the detected glass break event.

If, at 224, the average PSD (P2_AV) does not exceed the upper PSD threshold (P_TH1), the process flow may proceed to operation 226. Alternatively, operation 226 may be omitted in at least some implementations, and the process flow may instead return to operation 210. At 226, the method includes determining whether the average PSD (P2_AV) for the higher frequency band (Band 2) exceeds a lower PSD threshold (P_TH2) for the higher frequency band that is less than the upper PSD threshold (P_TH1). While operation 224 is depicted in FIG. 2 as being performed before operation 226, in at least some implementations operation 226 may be performed before operation 224, in parallel with operation 224, or operation 224 may be omitted. If the average PSD (P2_AV) does not exceed the lower PSD threshold (P_TH2), the process flow may return to operation 210. If the average PSD (P2_AV) exceeds the lower PSD threshold (P_TH2), the process flow may proceed to operation 228.

At 228, for at least some or all of the plurality of packets within the lower frequency band (Band 1), the method includes determining a minimum PSD (P1 MIN) among those packets within the lower frequency band based on the DFT data. Additionally, at 228, the method includes determining a maximum PSD (P1_MAX2) that occurs subsequent in time to the minimum PSD (P1_MIN) among those packets within the lower frequency band based on the DFT data. This maximum PSD (P1_MAX2) may be referred to as the second maximum, since it follows in time from the minimum PSD (P1_MIN).

The PSD determined for at least some of the plurality of packets within the lower frequency band may include multiple time-contiguous packets of the subsequent set of acceleration measurements captured within the period of time following the amplitude exceeding the initial threshold amplitude (A_TH). In at least some implementations, these multiple time-contiguous packets may be selected from all of the packets of the time period to occur after an initial offset time period following the amplitude exceeding the initial threshold amplitude (A_TH). As a non-limiting example, the PSD determined for at least some of the plurality of packets within the lower frequency band includes multiple time-contiguous packets of the subsequent set of acceleration measurements captured 100 milliseconds after the initial threshold amplitude is exceeded and within 500 or 1,000 milliseconds after the initial threshold amplitude is exceeded. For example, 8 of the latter time-contiguous packets (e.g., representing the last 400 milliseconds) of 10 time-contiguous packets (e.g., representing 500 milliseconds) of the time period may be used to determine P1_MAX2 and P1_MIN, while 2 of the preceding time-contiguous packets (e.g., representing the earlier 100 milliseconds) of the 10 time-contiguous packets may be excluded from consideration in operation 228. As another non-limiting example, 15 of the latter time-contiguous packets (e.g., representing the last 750 milliseconds) of 20 time-contiguous packets (e.g., representing 1,000 milliseconds) of the time period may be used to determine P1_MAX2 and P1_MIN, while 5 of the preceding time-contiguous packets (e.g., representing the earlier 250 milliseconds) of the 20 time-contiguous packets may be excluded from consideration in operation 228.

This exclusion technique may be used to reduce computation overhead associated with determining the PSD for packets of the lower frequency band, and determining maximums and minimums within the lower frequency band. It will be understood that other suitable quantities of packets may be considered or excluded from consideration in operation 228, and these quantities may vary with the selected duration of each packet and the total duration of the time period. Furthermore, the sub-range of the time period for which packets are considered in the operation 228 may be implementation-dependent or otherwise depend on the type of enclosure or window configuration being monitored.

At 230, the method includes determining whether the maximum PSD (P1_MAX2—i.e., second maximum) is greater than a first PSD threshold (P_TH3) for the lower frequency band, and whether a difference between the maximum PSD (P1_MAX2) and the minimum PSD (P1_MIN) is greater than a second PSD threshold (P_TH4) for the lower frequency band. If the conditions of operation 230 are satisfied, the process flow may proceed to operation 240 where a glass break event is detected. At 242, the method includes, upon determining that the conditions of operation 230 are satisfied, outputting an indication of the detected glass break event. However, in at least some implementations, operation 230 may include only one of the previously two conditions. If the conditions of operation 230 are not satisfied, the process flow may return to operation 210. Accordingly, within the context of method 200 of FIG. 2, operations 228-230 may be performed upon determining that the average PSD for the higher frequency band exceeds the lower PSD threshold for the higher frequency band but does not exceed the upper PSD threshold for the higher frequency band.

In at least some implementations, outputting the indication of the detected glass break event at 242 may include one or more of the following operations: (1) transmitting the indication over a wireless communications link to a remote computing device, (2) displaying the indication via a graphical display device or otherwise outputting the indication via an output device, (3) initiating an alarm, (4) activating or deactivating an electronic function, (5) storing the indication in a data storage device, etc.

Within the context of method 200 implemented by a computing system, the computing system includes the telematics device, and may further include one or more computing devices remotely located from the telematics device. As a non-limiting example, the telematics device obtains the initial set of acceleration measurements, determines whether the one or more acceleration measurements of the initial set exceeds the initial threshold amplitude, and obtains the subsequent set of acceleration measurements. Method 200 may further include transmitting the subsequent set of acceleration measurements from the telematics device to the one or more computing devices over a wireless communications link for further processing by the one or more computing devices in accordance with method 200. As another example, the set of one or more accelerometer sensors may instead form part of an electronic control system of a vehicle or other enclosure, and aspects of method 200 may be performed by the electronic control system.

Figure 3:
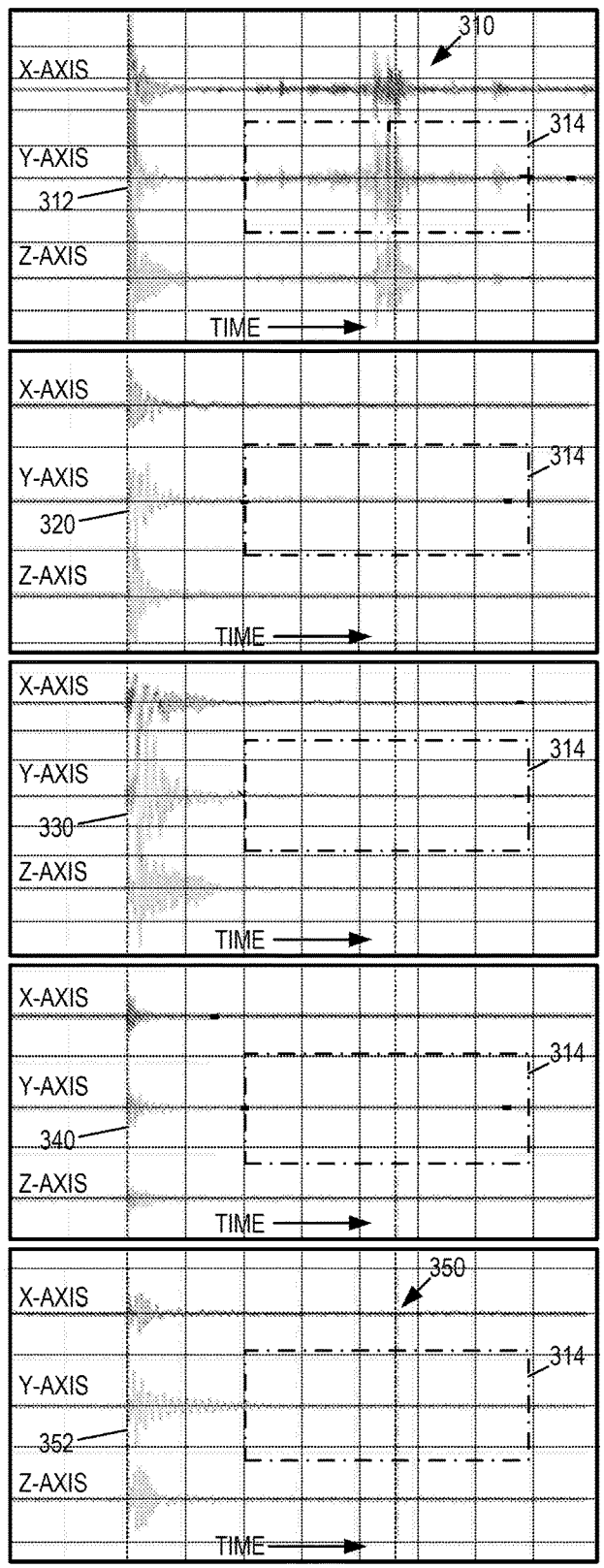
FIG. 3 depicts a time domain sample recorded from four different events on a passenger vehicle, as an example of an enclosure.

The detection techniques disclose herein rely, at least in part, on frequency domain analysis of the acceleration measurements, including measurements of vibration, for example. FIG. 3 depicts a time domain sample recorded from four different events on a passenger vehicle, as an example of an enclosure. A time domain sample of acceleration measurements may be referred to as an acceleration signal, and this signal may be time varying based on the time-sequence of acceleration measurements obtained via one or more acceleration sensors. Within FIG. 3, acceleration signals are depicted side by side for a glass break event 310 on a driver-side window of a vehicle, a punch impact event 320 on the driver-side window that did not result in a glass break event, a door close event 330 on the driver-side window that did not result in a glass break event, a stone impact event 340 on the driver-side window that did not result in a glass break event, and a glass break event 350 on a passenger-side window of the vehicle. The acceleration signals of FIG. 3 were obtained from a 3-axis array of acceleration sensors of a telematics device that was physically and operatively connected to an OBDII port of the vehicle residing near steering column of the vehicle.

As can be seen in FIG. 3, the acceleration signal associated with glass break event 310 differs from acceleration signals associated with other events 320, 330, and 340 that did not result in a glass break event. Acceleration signals associated with glass break event 310 has a higher amplitude with higher frequencies as compared to acceleration signals associated with other events 320, 330, and 340. Additionally, the acceleration signal of glass break event 310 does not exhibit continuous dampening as compared to other events 320, 330, and 340. In FIG. 3, the horizontal time scale is 0.1 sec/div., and the vertical voltage scale is 0.2 volts/div. The amplitude of the acceleration signal of the glass break event 310 initially reduces after an initial impact event 312, and then after approximately 200-400 ms the signal amplitude of the acceleration signal of the glass break event 310 begins to increase. This is increase is due to the subsequent impact of falling glass debris on the vehicle's body. The power and amplitude of this post-breakage signal is related to the size of the glass and how the glass shatters. For purposes of comparison, a time period 314 within which amplitude of the acceleration signal increases due to the glass break event 310 is included among the remaining events depicted in FIG. 3 for Y-axis acceleration measurements.

The passenger-side glass break event 350 resulting from an impact event 352 also includes the same signal-related features as the driver-side glass break event 310. However, the acceleration signal of glass break event 350 exhibits a lesser overall amplitude due to an increase in distance of the passenger-side window from the telematics device that contains the acceleration sensors as compared to the driver-side window. In at least some implementations, method 200 of FIG. 2 may additionally include an operation by which a glass break event associated with a driver-side window is distinguished from a glass break event associated with a passenger-side window based on differences in amplitude associated with the detected glass break portion of the acceleration signals.

According to field tests on passenger vehicles, the recorded maximum amplitude of an acceleration signal in a glass break event for a driver-side window using a telematics device physically and operatively coupled to an OBD-II port of the vehicle is in range of 0.3-3 g. By defining a detection threshold on the amplitude of the acceleration signal, many of other events that do not include a glass break event can be ignored or otherwise filtered from the acceleration measurements. As previously discussed with regards to the initial monitoring mode of method 200, recognition of these typical acceleration ranges may be used to put a microcontroller or other logic device of the telematics device in a low power mode until processing associated with the subsequent glass break detection mode is needed. This initial acceleration threshold may, as a non-limiting example, be set to A_TH=0.1 g (0.2 g peak-to-peak). As previously described with regards to method 200, if an acceleration signal with an amplitude higher than the initial acceleration threshold (A_TH) is detected, the telematics device may begin to record and analyze the acceleration data at a specified sampling rate and for at least a specified time period. For example, approximately 500-1,000 milliseconds of acceleration data with a sampling rate of at least 2,000 samples per second may be captured. According to Nyquist theorem the sampling frequency of a signal with frequency f, should be twice (2f) of its frequency. Therefore, to capture vibration in the acceleration signals of up to 1 kHz, a minimum sampling frequency of at least 2 kHz would be used.

As previously described with regards to method 200, captured acceleration data is then split into packets for FFT or other DFT processing. FFT or other forms of DFT transform a time domain signal to the frequency domain. Every time domain signal can be extracted to a sum of pure sine waves with different frequencies and amplitudes, and DFT/FFT may be used to extract the amplitude of each of these sine waves. Sample code for implementing a DFT/FFT algorithm may be found in MATLAB™ predefined FFT library, and publicly available open source libraries and product literature also provide FFT functions for microcontrollers, such as those manufactured or licensed by ARM™, as non-limiting examples.

After applying the DFT/FFT to each of the data packets with N number of samples in each packet, an array of N/2 frequency bins are generated as the output of the DFT/FFT where X_0 is the amplitude of the DC component, and X_N/2 is amplitude of the highest frequency component fs/2 (half of the sampling frequency fs). The frequency resolution of the DFT/FFT is fs/N. As a non-limiting example, N=1024 may be used, which results in 512 frequency bins and a sampling frequency of an analog-digital converter (ADC) may be 22 kHz, thereby providing a frequency resolution of approximately 21.5 Hz. The DFT/FFT output may be transformed into decibels for easier demonstration:

$$P\_k(dB) = 20 * \log(X\_k)$$

where X_k is the voltage or acceleration RMS value of the frequency bin "k". Using decibel values may also help to handle changes in the sensitivity of the acceleration sensors, resolution of the ADC, and noise level of the sensor/ADC as all of these changes may appear as offsets in logarithmic scale, instead of coefficients in a linear scale, and thus the amount of changes in values will remain the same for different sensor/board configurations. Field testing suggests that the DC and low frequency components may be ignored in at least some implementations as they hold less useful information for glass break detection. As depicted in FIG. 11, other components may be averaged in the two different frequency bands (e.g., P1(20-200 Hz) and P2(200-1000 Hz)) in order to calculate the power spectral density (PSD) in each band. In the equation of FIG. 11, n1 and n2 may be calculated based on the frequency resolution of each bin (n1=10 and n2=47 as a non-limiting example). The average PSD of the high frequency band (e.g., P2_AV: 200-1000 Hz) may be calculated over all of the packets (e.g., 10 packets) in the 500 ms time frame: P2_AV=(P2_1+ . . . +P2_10)/10. The average PSD of the lower frequency band (e.g., 20-200 Hz) has not been used for the glass break detection, as this component's value becomes may become fairly large in the other events not associated with a glass break event.

Figure 4:
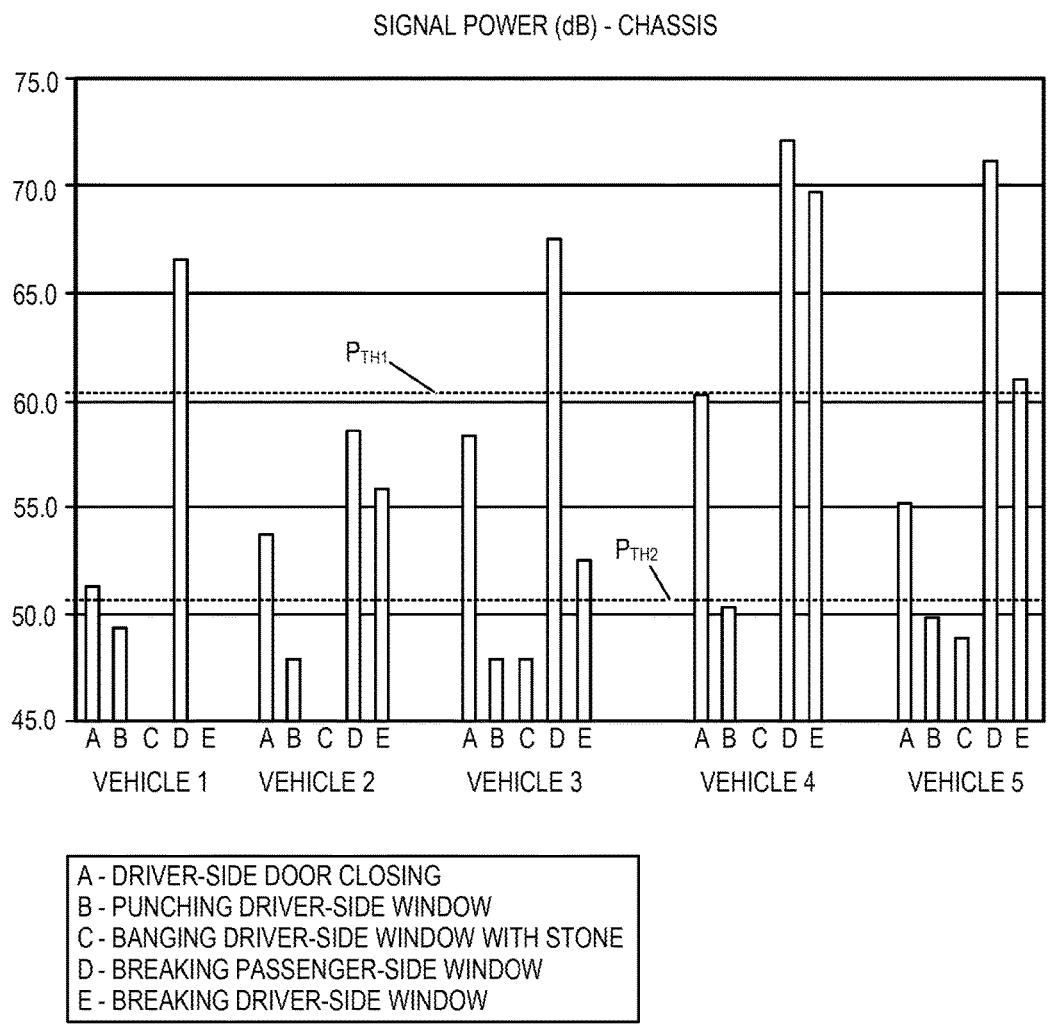
FIG. 4 shows an example of signal power as a dB value for different vehicles and events in field testing.

FIG. 4 shows signal power as a dB value for different vehicles and events in field testing for average signal power (P2_AV) of an acceleration sensor attached to a chassis of the vehicle in an example higher frequency band (e.g., 200-1000 Hz). As can be seen in FIG. 4, four out of five driver-side glass break events, and two out of four passenger-side glass break events can be detected by comparing the P2_AV value with a minimum threshold P_TH1. FIG. 4 also shows that the only other event that has high power comparable to a glass break event is a door closing event. All or most other impact events have considerable lower P2_AV as compared to a glass break event.

In order to improve detection accuracy and reduce or eliminate false negatives, the conditions associated with operations 226, 228, and 230 of method 200 may be used. At least for vehicle implementations, a glass break event typically has a post-breakage signal after about 0.2-0.4 seconds from the initial impact event. Therefore, a second power threshold P_TH2 may be defined in the detection algorithm in order to detect signals that have lower PSD. After detection of the signal with a PSD higher that P_TH2, the algorithm will check for the presence of a post-breakage signal. This is done by analyzing the signal's PSD in the lower frequency band (e.g., P1: 20-200 Hz), as the drop of glass debris generates a lower frequency vibration compare to the initial impact itself. The algorithm may begin to search for the minimum and the 2nd maximum (a maximum peak value after reaching to a minimum) values of the P1 within a time period following the initial impact event (e.g., 100-500 ms time frame or packets 3-10). If P1_MAX2 is greater than the threshold P_TH3 and the difference P1_MAX2 and P1_MIN is greater than the threshold P_TH4, then the event will be detected as a glass break event. As a non-limiting example, P_TH1=61 dB, P_TH2=51 dB, P_TH3=65 dB, and P_TH4=4 dB. However, it will be understood that other suitable thresholds may be used.

FIG. 5 is a table that includes example PSD values obtained from a vehicle in which the above threshold values can be used to distinguish a passenger-side glass break event (8) from a door close event (1). Even though the P2_AV for a door close event is higher than the P2_AV for a glass break event in this example, the post-breakage signal detection can be used to differentiate these two events from each other.

Figure 6:
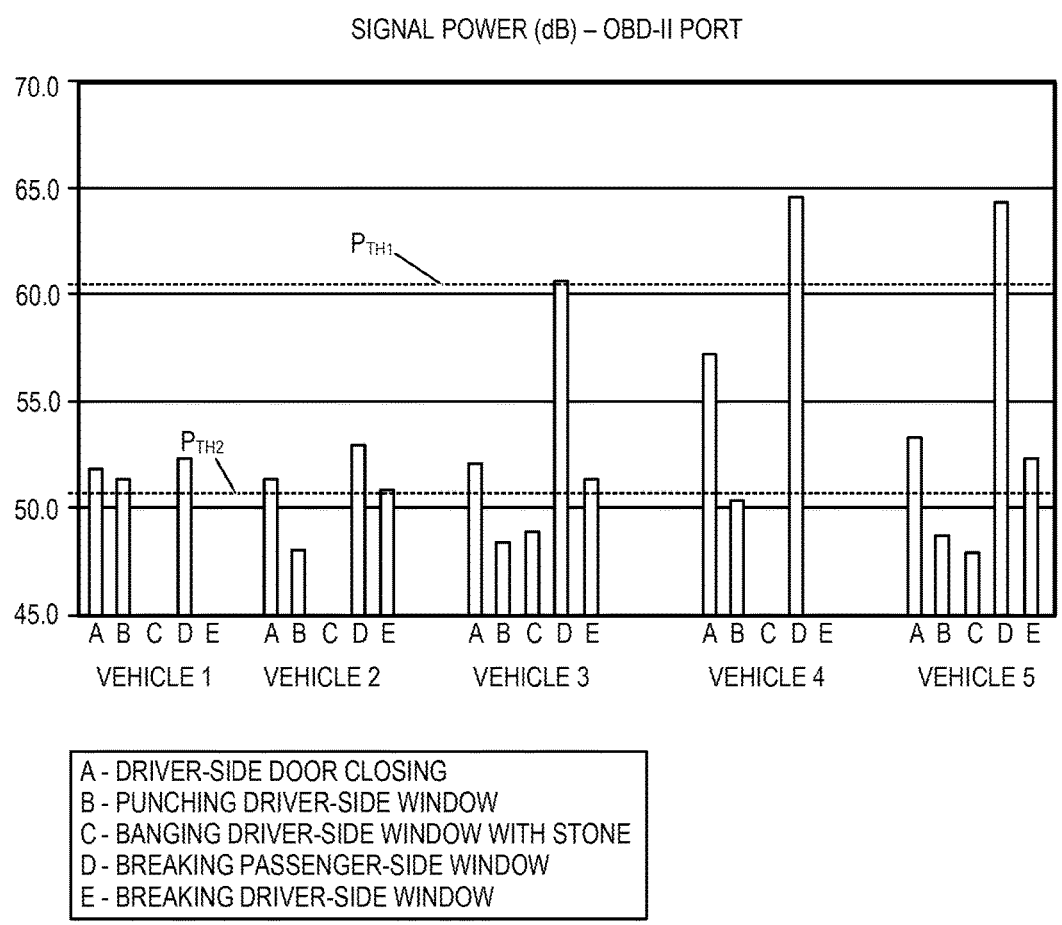
FIG. 6 depicts an example of power spectral density plotted for an accelerometer.

In order to illustrate the effect of an OBD-II port on dampening the vibration signals detected by a telematics device physically and operatively coupled to that port, the P2_AV signal PSD has been plotted for an accelerometer of the telematics device in FIG. 6. In general, analyzing the captured data in frequency domain shows the OBD-II port attenuate the signals in the frequency range of >800 Hz more than the lower frequencies. In many cases, the P2_AV value has been attenuated 3-7 dB as compared to the signals that have been captured directly from the vehicle's chassis. However, the driver's window break signal is still the most powerful signal in these examples. As illustrated by FIG. 6, for the passenger-side glass-break event, the signal's power has attenuated more and become more comparable with the door close event. However, by using post-breakage signal detection, the glass break event is still detectable.

In at least some implementations, dynamic threshold values may be used instead of fixed values to increase the accuracy of glass break detection. As an example, the threshold values may be set or otherwise defined according to enclosure type (e.g., vehicle make, model, year, etc.) and/or by defining a calibration algorithm for setting the threshold values (e.g., prompt a user via a application program operating on a mobile computing device to open/close doors of the vehicle/enclosure and set the thresholds based on the power level of those signals). This prompting of the user may form an additional set of operations that may be implemented prior to performing method 200.

Figure 7:
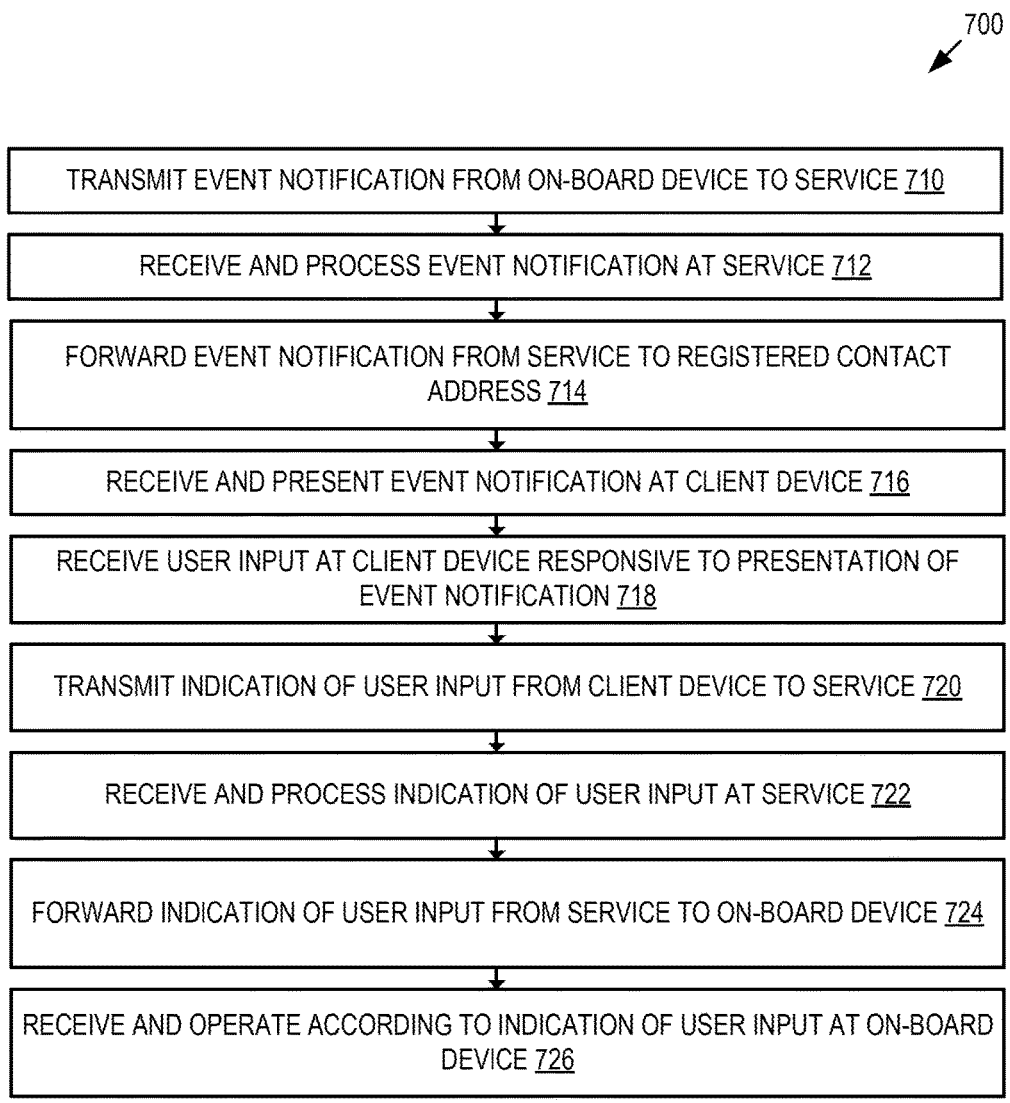
FIG. 7 is a flow diagram depicting an example method 700 for event notification.

FIG. 7 is a flow diagram depicting an example method 700 for event notification. Event notification may be performed following detection of an impact event and/or following detection of a glass break event. As one example, method 700 may be performed by a computing system, which may include a telematics device, or a telematics device in combination with an on-board electronic system of a vehicle or other enclosure, a network service hosted at a server system, and/or a client computing device.

At 710, the method includes transmitting an event notification from a telematics device over a wireless communications network. An event notification may indicate one or more of an identity of the telematics device (e.g., an identifier or indication of an identifier of the telematics device), an identity of the vehicle, an identity a user account registered with the telematics device and/or vehicle, and/or the identities of one or more wireless enabled devices (e.g., an identifier of each wireless device or indication of the identifier) detected as being present at the vehicle. An event notification may further indicate a type of event that was detected at the vehicle by the telematics device (e.g., impact event, driver-side glass break event, passenger-side glass break event, etc.) and/or additional information describing the event. For example, a number of G-forces measured via an acceleration sensor on-board the vehicle may indicate a severity of an impact to the vehicle that may be communicated as part of an event notification. The event notification may be transmitted to the point of contact registered with the telematics device, or may be transmitted to a network service that maintains the point of contact for an identifier of the telematics device and/or vehicle identity contained within the event notification.

At 712, the method includes receiving and processing the event notification at the service. For example, the service may be hosted at server system that receives the event notification, and processes the event notification according to a predetermined process defined by an account owner associated with the identity of the telematics device, identity of the vehicle, or the registered identifier indicated by the event notification message. Such processing may include filtering messages, augmenting messages with additional content or less content, forwarding aspects of the message to another network device, and/or storing messages in a data store.

At 714, the method includes forwarding the event notification from the service to a registered contact address for the registered identifier. The registered contact address may include an email address, a telephone number, or other suitable network address. The event notification may be forwarded to the registered contact address in original form or in a processed form. The event notification may be forwarded to the registered contact address as an email message, an SMS message, an automated voice call, or other suitable message.

At 716, the method includes receiving and presenting the event notification at a client device. The client device may display or otherwise present the event notification to a user responsive to receiving the event notification. In at least some implementations, an application program operating at the client device may be configured to receive and present notification messages that are received from the service or from the telematics device.

At 718, the method includes receiving user input at the client device responsive to presentation of the event notification. The user may provide a user input to indicate a user selection or control input of the user. The user input may be provided via an application program operating at the client device.

At 720, the method includes transmitting an indication of the user input from the client device to the service over a communication network. Alternatively, the indication may be transmitted to the telematics device that bypasses the service.

At 722, the method includes receiving and processing the indication of user input at the service. Such processing may include filtering indications, augmenting indications with additional information or less information, forwarding aspects of the indication to another network device, and/or storing the indication in a data store.

At 724, the method includes forwarding the indication of user input from the service to the telematics device. The indication may be forwarded in original form or may be processed prior to forwarding.

At 726, the method includes receiving the indication over a wireless communication network, and operating according to the indication of user input at the telematics device. For example, the indication may direct the telematics device to perform one or more operations and/or may preclude the telematics device from performing one or more operations.

The above described methods and processes may be tied to a computing system including one or more computing devices. In particular, the methods and processes described herein may be implemented as one or more applications, service, application programming interfaces, computer libraries, and/or other suitable computer programs or instruction sets.

Figure 8:
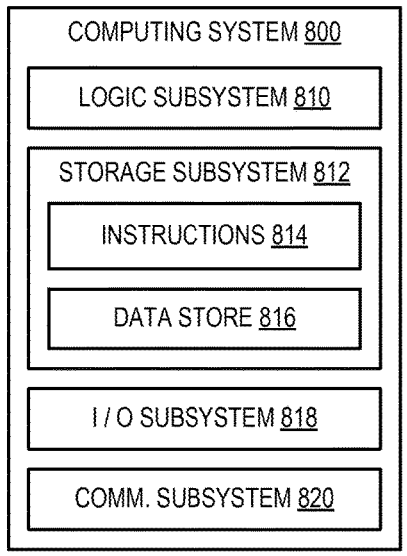
FIG. 8 is a schematic diagram depicting an example computing system.

FIG. 8 is a schematic diagram depicting an example computing system 800 that may perform one or more of the above described methods and operations. Computing system 800 is shown in simplified form. It is to be understood that virtually any computer architecture may be used without departing from the scope of this disclosure. Computing system 800 or portions thereof may take the form of one or more of a mainframe computer, a server computer, a telematics device, a computing device residing on-board a vehicle, a desktop computer, a laptop computer, a tablet computer, a home entertainment computer, a network computing device, a mobile computing device, a mobile communication device, a gaming device, etc.

Computing system 800 includes a logic subsystem 810 and an information storage subsystem 812. Computing system 800 may further include an input/output subsystem 818 and a communication subsystem 820. Logic subsystem 810 may include one or more physical devices configured to execute instructions, such as example instructions 814 held in storage subsystem 812. For example, the logic subsystem may be configured to execute that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem includes hardware in the form of one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Storage subsystem 812 includes one or more physical, non-transitory, machines or devices configured to hold data in data store 816 and/or instructions 814 executable by the logic subsystem to implement the herein described methods and processes. When such methods and processes are implemented, the state of storage subsystem 812 may be transformed (e.g., to hold different data or other suitable forms of information).

Storage subsystem 812 may include removable media and/or built-in devices. Storage subsystem 812 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Storage subsystem 812 may include devices with one or more of the following characteristics: volatile, nonvolatile, dynamic, static, read/write, read-only, random access, sequential access, location addressable, file addressable, and content addressable. In at least some implementations, logic subsystem 810 and storage subsystem 812 may be integrated into one or more common devices, such as an application specific integrated circuit or a system on a chip.

It is to be appreciated that storage subsystem 812 includes one or more physical, non-transitory devices. In contrast, in at least some implementations and under select operating conditions, aspects of the instructions described herein may be propagated in a transitory fashion by a signal (e.g., an electromagnetic signal, an optical signal, etc.) that is not held by a physical device for at least a finite duration. Furthermore, data and/or other forms of information pertaining to the present disclosure may be propagated by a signal.

The terms "module" or "program" may be used to describe an aspect of a computing system that is implemented to perform one or more particular functions. In some cases, such a module or program may be instantiated via logic subsystem 810 executing instructions held by storage subsystem 812. It is to be understood that different modules or programs may be instantiated from the same application, service, code block, object, library, routine, API, function, etc. Likewise, the same module or program may be instantiated by different applications, services, code blocks, objects, routines, APIs, functions, etc. The terms "module" or "program" are meant to encompass individual or groups of executable files, data files, libraries, drivers, scripts, database records, etc.

It is to be appreciated that a "service", as used herein, may be an application program or other suitable instruction set executable across multiple sessions and available to one or more system components, programs, and/or other services. In at least some implementations, a service may run on a server or collection of servers responsive to a request from a client (e.g., an on-board computing device, a wireless mobile device, or other networked computing device).

Input/output subsystem 818 may include and/or otherwise interface with one or more input devices and/or output devices. Examples of input devices include a keyboard, keypad, touch-sensitive graphical display device, touch-panel, a computer mouse, a pointer device, a controller, an optical sensor, an acceleration sensor, a pressure sensor, a microphone, etc. Examples of output devices include a graphical display device, a touch-sensitive graphical display device, an audio speaker, a haptic feedback device (e.g., a vibration motor), etc. When included, a graphical display device may be used to present a visual representation of data held by storage subsystem 812. As the herein described methods and processes change the data held by the storage subsystem, and thus transform the state of the storage subsystem, the state of the graphical display may likewise be transformed to visually represent changes in the underlying data.

Communication subsystem 820 may be configured to communicatively couple computing system 800 with one or more other computing devices or computing systems. Communication subsystem 820 may include wired and/or wireless communication devices compatible with one or more different communication protocols. As an example, the communication subsystem may be configured for communication via a wireless telephone network, a wireless local area network, a wired local area network, a wireless personal area network, a wired personal area network, a wireless wide area network, a wired wide area network, etc. In at least some implementations, the communication subsystem may enable computing system 800 to send and/or receive messages to and/or from other devices via a communications network such as the Internet, for example.

Figure 9:
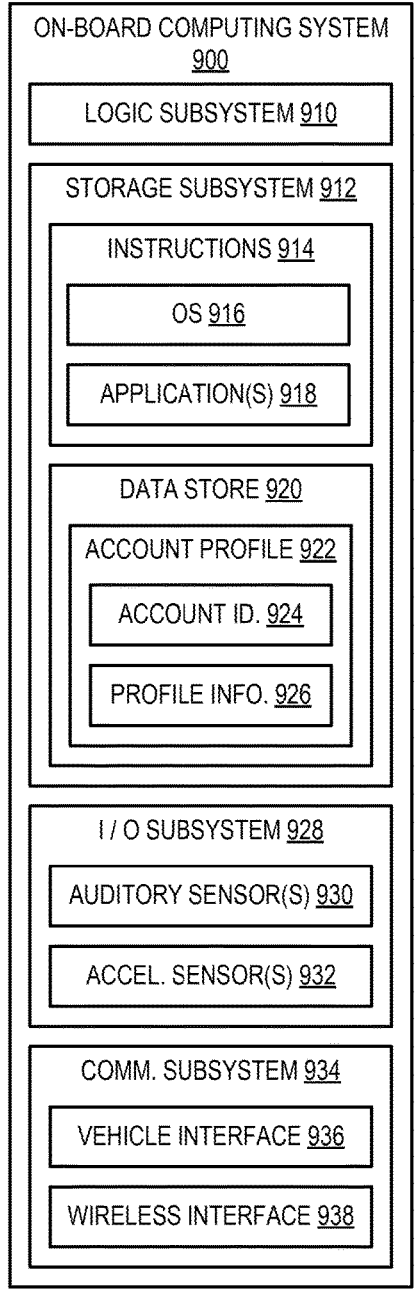
FIG. 9 is a schematic diagram depicting an example of an on-board computing system for a vehicle.

FIG. 9 is a schematic diagram depicting an example of an on-board computing system 900, such as for a vehicle or other enclosure. In one example, on-board computing system 900 may include or take the form of previously described telematics device 120 of FIG. 1. In such case, the telematics device may take the form of a computing device that is independent of the on-board electronic system of the vehicle or enclosure. As another example, on-board computing system 900 may include or take the form of a combination of previously described telematics device 120 and on-board electronic system 112 of FIG. 1.

On-board computing system 900 or a computing device thereof includes a logic subsystem 910, and a storage subsystem 912 having instructions 914 and a data store 920 stored thereon. Instructions 914 may include an operating system 916 and one or more application programs 918. Data store 920 may include one or more account profiles 922 that contain and/or are associated with a respective account identifier 924 and profile information 926. Account identifier 924 may take the form of an identifier received from a wireless enabled device or may be associated with such an identifier. Data store 920 may further include raw data obtained from one or more sensors (e.g., acceleration sensors) of the telematics device and/or an on-board electronic system. Raw data may be processed and stored in various formats in profile information 926, which may differ or vary among individual account profiles depending on user settings, applications states, etc.

On-board computing system 900 includes an input/output subsystem 928 that includes one or more auditory sensors 930 and/or one or more motion sensors 932 (i.e., acceleration sensors). On-board computing system 900 includes a communication subsystem 934 that includes a vehicle interface 936 and one or more wireless interfaces 938. Vehicle interface 936 may include or take the form of previously described interface 122 of FIG. 1. A wireless interface may include a wireless transceiver and/or associated electronics that enable the on-board computing system to communicate with another device over a wireless communications network according to one or more wireless communications protocols.

Figure 10:
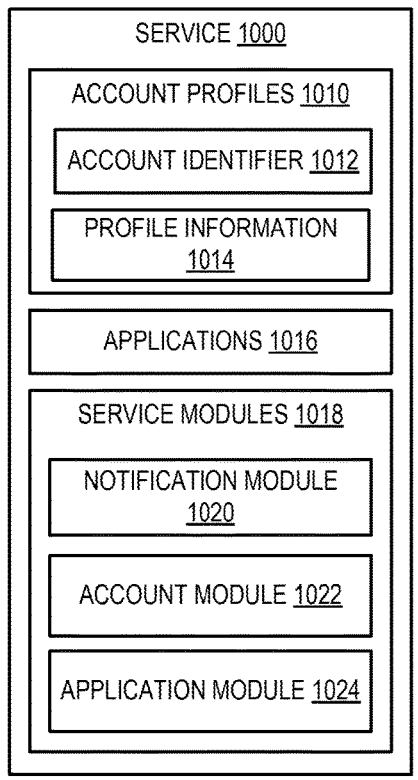
FIG. 10 is a schematic diagram depicting aspects of an example network service.

FIG. 10 is a schematic diagram depicting aspects of an example network service 1000. As one example, network service 1000 may include or take the form of previously described service 162 of FIG. 1. Network service 1000 may maintain a data store includes one or more account profiles 1010 that each contain and/or are associated with a respective account identifier 1012 and profile information 1014. Network service may further include raw data obtained from one or more on-board vehicle computing systems, such as acceleration data or detected events. Raw data may be processed and stored in various formats in profile information, which may differ or vary among individual account profiles depending on user settings, applications states, etc.

Service 1000 may include one or more applications that may be distributed to and downloaded by one or more other computing devices. For example, one or more mobile computing devices, telematics devices, server devices, etc. may download application programs to augment the user experience provided by or through a telematics device located on-board a vehicle or enclosure. In at least some implementations, service 1000 may host or otherwise provide an application program store or library from which application programs may be purchased or obtained by subscribers or members of the public.

Service 1000 may include one or more service modules 1018 for providing cloud based functionality. For example, a notification module 1020 may receive, process, and forward event notifications and response messages between telematics devices and client devices. As another example, an account module 1022 may associate profile information with account identifiers, and enable other computing devices, such as on-board computing systems and/or client devices to access account profile information via an application programming interface (API). As yet another example, an application module 1024 may distribute and/or manage application programs operating at on-board computing systems and/or client devices. Application module 1024 may support the ability for users to port applications, data, and/or preferences stored in a user account across multiple on-board computing systems.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and sub-combinations of the various processes, systems and configurations, and other features, functions, acts, and/or properties disclosed herein, as well as any and all equivalents thereof. It should be understood that the disclosed embodiments are illustrative and not restrictive. Variations to the disclosed embodiments that fall within the metes and bounds of the claims, now or later presented, or the equivalence of such metes and bounds are embraced by the claims.

The invention claimed is:

1. A method performed by a computing system for detecting a glass break event for a window, the method comprising:
    obtaining an initial set of acceleration measurements from a set of one or more accelerometer sensors;
    determining whether one or more acceleration measurements of the initial set exceeds an initial threshold amplitude;
    upon determining that the initial threshold amplitude is exceeded by one or more acceleration measurements of the initial set, obtaining a subsequent set of acceleration measurements from the set of one or more accelerometer sensors, the subsequent set including acceleration measurements captured in a time-based sequence over a time period at a sampling rate;
    dividing the subsequent set of acceleration measurements into a plurality of packets in which each packet includes a subset of the acceleration measurements of the subsequent set that were captured in a respective time range portion of the time period;
    performing, for each packet, a discrete Fourier transform (DFT) of the time-based sequence of the acceleration measurements of that packet to obtain DFT data in a frequency domain for that packet;
    determining a power spectral density (PSD) for each packet within a higher frequency band based on the DFT data;
    determining an average PSD for the higher frequency band across the plurality of packets based on the PSD determined for each packet within the higher frequency band;
    determining whether the average PSD for the higher frequency band exceeds an upper PSD threshold for the higher frequency band; and
    upon determining that the average PSD for the higher frequency band exceeds the upper PSD threshold, outputting an indication of a detected glass break event.

2. The method of claim 1, further comprising:
    determining whether the average PSD for the higher frequency band exceeds a lower PSD threshold for the higher frequency band that is less than the upper PSD threshold;
    upon determining that the average PSD for the higher frequency band exceeds the lower PSD threshold for the higher frequency band but does not exceed the upper PSD threshold for the higher frequency band,
        determining a PSD for at least some of the plurality of packets within a lower frequency band that is less than the higher frequency band based on the DFT data,
        determining a minimum PSD among the at least some of the plurality of packets within the lower frequency band based on the DFT data,
        determining a maximum PSD subsequent in time to the minimum PSD among the at least some of the plurality of packets within the lower frequency band based on the DFT data,
        determining whether the maximum PSD is greater than a first PSD threshold for the lower frequency band, and whether a difference between the maximum PSD and the minimum PSD is greater than a second PSD threshold for the lower frequency band; and
    upon determining that the maximum PSD is greater than the first PSD threshold for the lower frequency band, and that the difference between the maximum PSD and the minimum PSD is greater than the second PSD threshold for the lower frequency band, outputting an indication of a detected glass break event.

3. The method of claim 2, wherein outputting the indication of the detected glass break event includes:
    transmitting the indication over a wireless communications link to a remote computing device.

4. The method of claim 2, wherein outputting the indication of the detected glass break event includes:
    displaying the indication via a graphical display device and/or initiating an alarm.

5. The method of claim 2, wherein outputting the indication of the detected glass break event includes deactivating an electronic function.

6. The method of claim 2, wherein the lower frequency band and the higher frequency band are delineated from each other by at least one frequency that is within a range of 150-250 Hz.

7. The method of claim 2, wherein the lower frequency band includes at least some frequencies within a range of 0-200 Hz, and the upper frequency band includes at least some frequencies within a range of 200-1,500 Hz.

8. The method of claim 2, wherein the lower frequency band is contained within a range of 0-200 Hz, and the upper frequency band is contained within a range of 200-1,500 Hz.

9. The method of claim 2, wherein the PSD determined for at least some of the plurality of packets within the lower frequency band includes multiple time-contiguous packets of the subsequent set of acceleration measurements captured 100 milliseconds after the initial threshold amplitude is exceeded and within 1,000 milliseconds after the initial threshold amplitude is exceeded.

10. The method of claim 1, wherein the time period for which the subsequent set of acceleration measurements is captured is within 1,000 milliseconds of the initial threshold amplitude being exceeded by the one or more acceleration measurements of the initial set.

11. The method of claim 1, wherein the sampling rate is 2,000 samples per second or greater.

12. The method of claim 1, wherein the DFT includes a fast Fourier transform (FFT).

13. The method of claim 1, wherein the set of one or more accelerometer sensors form part of a telematics device that is removably connected to an on-board diagnostics (OBD) port.

14. The method of claim 1, wherein the computing system includes the telematics device, and further includes one or more computing devices remotely located from the telematics device;
    wherein the telematics device obtains the initial set of acceleration measurements, determines whether the one or more acceleration measurements of the initial set exceeds the initial threshold amplitude, and obtains the subsequent set of acceleration measurements; and wherein the method further comprises, transmitting the subsequent set of acceleration measurements from the telematics device to the one or more computing devices over a wireless communications link.

15. The method of claim 1, wherein the set of one or more accelerometer sensors form part of an electronic control system; and
wherein the computing system includes the electronic control system.

16. A computing system detecting a glass break event for a window, the computing system comprising:
one or more computing devices programmed with instructions executable by the one or more computing devices to:
obtain an initial set of acceleration measurements from a set of one or more accelerometer sensors;
determine whether one or more acceleration measurements of the initial set exceeds an initial threshold amplitude;
upon determining that the initial threshold amplitude is exceeded by one or more acceleration measurements of the initial set, obtain a subsequent set of acceleration measurements from the set of one or more accelerometer sensors, the subsequent set including acceleration measurements captured in a time-based sequence over a time period at a sampling rate;
divide the subsequent set of acceleration measurements into a plurality of packets in which each packet includes a subset of the acceleration measurements of the subsequent set that were captured in a respective time range portion of the time period;
perform, for each packet, a discrete Fourier transform (DFT) of the time-based sequence of the acceleration measurements of that packet to obtain DFT data in a frequency domain for that packet;
determine a power spectral density (PSD) for each packet within a higher frequency band based on the DFT data;
determine an average PSD for the higher frequency band across the plurality of packets based on the PSD determined for each packet within the higher frequency band;
determine whether the average PSD for the higher frequency band exceeds a lower PSD threshold for the higher frequency band;
upon determining that the average PSD for the higher frequency band exceeds the lower PSD threshold for the higher frequency band,
determine a PSD for at least some of the plurality of packets within a lower frequency band that is less than the higher frequency band based on the DFT data,
determine a minimum PSD among the at least some of the plurality of packets within the lower frequency band based on the DFT data,
determine a maximum PSD subsequent in time to the minimum PSD among the at least some of the plurality of packets within the lower frequency band based on the DFT data, and
determine whether the maximum PSD is greater than a first PSD threshold for the lower frequency band, and whether a difference between the maximum PSD and the minimum PSD is greater than a second PSD threshold for the lower frequency band; and
upon determining that the maximum PSD is greater than the first PSD threshold for the lower frequency band, and that the difference between the maximum PSD and the minimum PSD is greater than the second PSD threshold for the lower frequency band, outputting an indication of a detected glass break event.

17. The computing system of claim 16, wherein the one or more computing devices are further programmed with instructions executable by the one or more computing devices to:
determine whether the average PSD for the higher frequency band exceeds an upper PSD threshold for the higher frequency band that is greater than the lower PSD threshold; and
upon determining that the average PSD for the higher frequency band exceeds the upper PSD threshold for the higher frequency band, output an indication of a detected glass break.

18. The computing system of claim 17, wherein the time period for which the subsequent set of acceleration measurements is captured is within 1,000 milliseconds of the initial threshold amplitude being exceeded by the one or more acceleration measurements of the initial set; and
wherein the sampling rate is 2,000 samples per second or greater.

19. A method performed by a computing system for detecting a glass break event for a window, the method comprising:
obtaining a set of acceleration measurements from a set of one or more accelerometer sensors, the set of acceleration measurements including acceleration measurements captured in a time-based sequence over a time period at a sampling rate;
dividing the set of acceleration measurements into a plurality of packets in which each packet includes a subset of the acceleration measurements of the set of acceleration measurements that were captured in a respective time range portion of the time period;
performing, for each packet, a discrete Fourier transform (DFT) of the time-based sequence of the acceleration measurements of that packet to obtain DFT data in a frequency domain for that packet;
determining a power spectral density (PSD) for each packet within a higher frequency band based on the DFT data;
determining an average PSD for the higher frequency band across the plurality of packets based on the PSD determined for each packet within the higher frequency band;
determining whether the average PSD for the higher frequency band exceeds one or more of an upper PSD threshold for the higher frequency band and/or a lower PSD threshold for the higher frequency band that is less than the upper PSD threshold;
upon determining that the average PSD for the higher frequency band exceeds the upper PSD threshold, outputting an indication of a detected glass break event;
upon determining that the average PSD for the higher frequency band exceeds the lower PSD threshold for the higher frequency band but does not exceed the upper PSD threshold for the higher frequency band,
determining a PSD for at least some of the plurality of packets within a lower frequency band that is less than the higher frequency band based on the DFT data,
determining a minimum PSD among the at least some of the plurality of packets within the lower frequency band based on the DFT data, determining a maximum PSD subsequent in time to the minimum PSD among the at least some of the plurality of packets within the lower frequency band based on the DFT data, determining one or more of whether the maximum PSD is greater than a first PSD threshold for the lower frequency band and/or whether a difference between the maximum PSD and the minimum PSD is greater than a second PSD threshold for the lower frequency band; and upon determining that the maximum PSD is greater than the first PSD threshold for the lower frequency band, and that the difference between the maximum PSD and the minimum PSD is greater than the second PSD threshold for the lower frequency band, outputting an indication of a detected glass break event.

20. The method of claim 19, further comprising, prior to obtaining the set of acceleration measurements:

obtaining an initial set of acceleration measurements from the set of one or more accelerometer sensors;

determining whether one or more acceleration measurements of the initial set exceeds an initial threshold amplitude; and upon determining that the initial threshold amplitude is exceeded by one or more acceleration measurements of the initial set, performing said obtaining the set of acceleration measurements from the set of one or more accelerometer sensors.

* * * * *